United States Patent
Sinclair et al.

(10) Patent No.: US 8,874,579 B2
(45) Date of Patent: Oct. 28, 2014

(54) SYSTEMS AND METHODS FOR IDENTIFYING ASSOCIATIONS BETWEEN MALWARE SAMPLES

(75) Inventors: Gregory Sinclair, Concord, NC (US); Ryan Olson, New York, NY (US); Robert Falcone, North Attleborough, MA (US)

(73) Assignee: Verisign, Inc., Reston, VA (US)

( * ) Notice: Subject to any disclaimer, the term of this patent is extended or adjusted under 35 U.S.C. 154(b) by 269 days.

(21) Appl. No.: 13/338,845

(22) Filed: Dec. 28, 2011

(65) Prior Publication Data

US 2013/0046763 A1 Feb. 21, 2013

Related U.S. Application Data

(60) Provisional application No. 61/524,971, filed on Aug. 18, 2011.

(51) Int. Cl.
| | |
|---|---|
| *G06F 7/00* | (2006.01) |
| *G06F 17/30* | (2006.01) |
| *H04L 29/06* | (2006.01) |
| *G06F 21/56* | (2013.01) |
| *G06Q 10/10* | (2012.01) |
| *H04L 12/58* | (2006.01) |

(52) U.S. Cl.
CPC ...... *G06F 17/30705* (2013.01); *H04L 63/1416* (2013.01); *G06F 17/30997* (2013.01); *G06F 21/564* (2013.01); *G06F 21/565* (2013.01); *G06Q 10/10* (2013.01); *G06F 17/30707* (2013.01); *G06F 17/30696* (2013.01); *H04L 51/12* (2013.01)
USPC ............................................. 707/737; 706/24

(58) Field of Classification Search
USPC ............................................. 707/737; 726/24
See application file for complete search history.

(56) References Cited

U.S. PATENT DOCUMENTS

| | | | |
|---|---|---|---|
| 7,266,843 B2 | 9/2007 | Tarbotton et al. | |
| 7,310,817 B2 | 12/2007 | Hinchliffe et al. | |

(Continued)

FOREIGN PATENT DOCUMENTS

| | | |
|---|---|---|
| AU | 2007200605 A1 | 10/2007 |
| EP | 1770509 A2 | 4/2007 |

(Continued)

OTHER PUBLICATIONS

Kornblum et al., "Identifying Almost Identical Files Using Context Triggered Pricewise Hashing," Digital Investigation, Elsevier, Sep. 1, 2006, pp. 91-97, vol. 1, Amsterdam, NL.

(Continued)

*Primary Examiner* — Jeffrey A Burke
(74) *Attorney, Agent, or Firm* — MH2 Technology Law Group, LLP

(57) ABSTRACT

Systems and methods are disclosed for identifying associations between binary samples, such as e-mail files and their attachments or a document and an executable program associated with the document. In one implementation, the method includes receiving a plurality of binary samples, and extracting metadata from the plurality of binary samples. The metadata for a binary sample from the plurality of binary samples includes a set of attributes of the binary sample. The method further includes identifying a set of associations between the plurality of binary samples based on the extracted metadata. Each association is characterized by at least one attribute the associated binary samples have in common, and each association has a confidence level indicative of a strength of the association. The method also includes identifying associations with a confidence level that exceeds a predefined threshold.

21 Claims, 6 Drawing Sheets

(56) References Cited

U.S. PATENT DOCUMENTS

| | | |
|---|---|---|
| 7,310,818 B1 | 12/2007 | Parish et al. |
| 7,356,843 B1 | 4/2008 | Kingsford |
| 7,673,147 B2 | 3/2010 | Moghe et al. |
| 7,774,451 B1 | 8/2010 | Bogorad et al. |
| 7,949,716 B2* | 5/2011 | Alperovitch et al. ......... 709/206 |
| 2005/0210472 A1 | 9/2005 | Accapadi |
| 2008/0005796 A1* | 1/2008 | Godwood et al. .............. 726/24 |
| 2008/0249977 A1 | 10/2008 | Tsunemi et al. |
| 2008/0263659 A1* | 10/2008 | Alme .............................. 726/22 |
| 2009/0320136 A1 | 12/2009 | Lambert et al. |
| 2010/0077481 A1 | 3/2010 | Polyakov et al. |
| 2011/0093426 A1 | 4/2011 | Hoglund |
| 2011/0185417 A1 | 7/2011 | Zhou et al. |
| 2012/0017275 A1* | 1/2012 | Harmonen ...................... 726/24 |
| 2012/0174227 A1* | 7/2012 | Mashevsky et al. ............ 726/24 |

FOREIGN PATENT DOCUMENTS

| | | |
|---|---|---|
| EP | 1986120 A1 | 10/2008 |
| WO | WO 03/021402 A2 | 3/2003 |

OTHER PUBLICATIONS

Partial European Search Report, issued from the European Patent Office, dated Oct. 24, 2012, in corresponding European Patent Application No. 12180484.3, 7 pages.

Extended European Search Report dated Feb. 25, 2013, issued by the European Patent Office in European Patent Application No. 12180484, pp. 1-16.

* cited by examiner

SYSTEMS AND METHODS FOR IDENTIFYING ASSOCIATIONS BETWEEN MALWARE SAMPLES

CROSS-REFERENCE TO RELATED APPLICATIONS

This application claims priority from U.S. provisional application No. 61/524,971, filed Aug. 18, 2011. The previously filed application is hereby incorporated by reference in its entirety.

FIELD

This disclosure is generally directed to systems and methods for collecting and analyzing data about computer files and, more particularly, to systems and methods for extracting attribute data from binary samples and identifying relationships between samples based on associations between the attribute data.

BACKGROUND

The growth of computer networking has brought with it users engaged in unscrupulous activities. Such activities include creating and distributing malicious software, or malware, used to attack computers on the network. For example, malicious software may cause disruption in activities, exposure of confidential information, or even damage to computer systems exposed to the software. Malware may take many forms, such as an attachment to an e-mail, code embedded or hidden in a document or web object, and other types of executable files transmitted over a network, such as the Internet.

Entities desire to learn about malicious software as soon as possible to inhibit its spread and mitigate its effects on productivity and computer systems. Because such software is modified from version to version, not distributed from the same source, and may be distributed using various means, it can be difficult to quickly identify newly created malware and appreciate its connection to known instances of malicious code.

Therefore, it is desirable to introduce tools to identify and present associations between binary samples of data to identify trends in malicious software and to minimize the potential adverse consequences which could arise out of distribution of such malware.

SUMMARY

The system of the present invention not only tracks malware, but also associates previously disconnected malware samples with one another using metadata extracted from the samples. Disclosed embodiments may provide analysts and other researchers with the intelligence necessary to make attribution decisions about malware and to find additional malicious and benign samples given a starting reference sample. Disclosed embodiments may allow researchers to not only properly catalogue malware samples, but also to cleanly navigate millions of samples through the use of concrete relationships between these samples.

In one aspect, a method is disclosed for identifying associations between binary samples. In one implementation, the method includes receiving a plurality of binary samples, and extracting metadata from the plurality of binary samples. The metadata for a binary sample from the plurality of binary samples includes a set of attributes of the binary sample. The method further includes identifying a set of associations between the plurality of binary samples based on the extracted metadata. Each association is characterized by at least one attribute that associated binary samples have in common, and each association includes a confidence level indicative of a strength of the association. The method also includes identifying associations with a confidence level that exceeds a predefined threshold.

In another aspect, a system is disclosed for identifying associations between binary samples. In one implementation, the system includes a controller configured to receive a plurality of binary samples from one or more sample providers. The system further includes one or more processing nodes. Each processing node is configured to extract metadata from the plurality of binary samples. The metadata for a binary sample from the plurality of binary samples includes a set of attributes of the binary sample. The processing node is further configured to identify a set of associations between the plurality of binary samples based on the extracted metadata. Each association is characterized by at least one attribute the associated binary samples have in common, and each association is associated with a confidence level indicative of a strength of the association. The processing node is also configured to identify associations with a confidence level that exceeds a predefined threshold.

Consistent with other disclosed embodiments, computer-readable media, such as CD, RAM, ROM, or other storage devices, may store program instructions that are executable by one or more processors to implement any of the methods disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Figure 1:
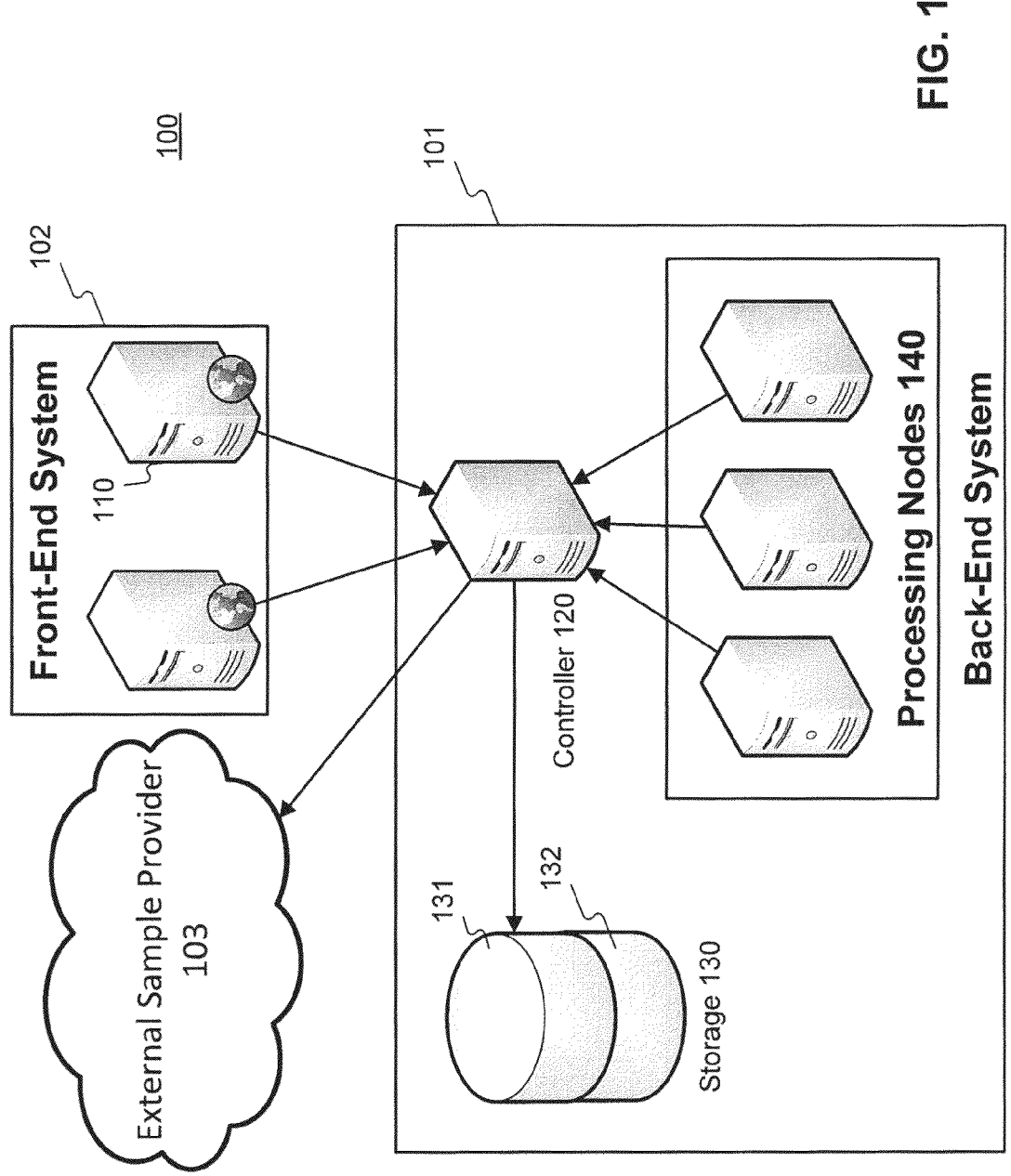
FIG. 1 is a diagram illustrating an exemplary metadata association system, consistent with disclosed embodiments.

Disclosed embodiments provide methods and systems for collecting malware samples from various locations for extraction and analysis. Disclosed embodiments may be adaptable to process multiple types of malware samples (also referred to as "input types" to the disclosed systems) ranging from compressed archives to executables to documents to Web objects. Disclosed embodiments may be modular to avow handling of additional input types as they appear. While disclosed embodiments may accept multiple input types, at a high level these input types may fall into more generalized categories, which allow similar treatment of input types in a more generalized manner.

The received data samples may include one or more sources and one or more samples. Consistent with the disclosed embodiments, a source may produce a sample. In other words, a source may be any mechanism (such as a file, code, or URL) that in some fashion directly results in the distribution of an additional mechanism (such as another file, code or URL). A source or a sample may be malicious or benign. Consistent with the disclosed embodiments, samples and sources may be collectively referred to as objects (i.e., sample objects and source objects).

Each source may be considered as both a potential source and a potential sample. For example, a PDF that contains malicious JavaScript that in turn generates shellcode may be both a source and a sample. With respect to the PDF itself, the JavaScript is a sample, given that the PDF contains (or distributes) the JavaScript that it executes. On the other hand, the JavaScript, upon execution, generates the shellcode, which by definition makes the JavaScript a source of the shellcode sample. Accordingly, the disclosed embodiments may treat sources as both potential sources and samples during processing. By treating a sample as both a source and a sample, hierarchies become more apparent.

Disclosed embodiments enable identification of associations between samples and sources. While samples may come in many forms, they may ultimately originate from a same source. For example, an e-mail may contain a malicious PDF that in turn drops a malicious executable program, simply referred to as a "malicious executable." To understand the origins of the malicious executable, it may be helpful to have a path tracing back to the originating e-mail that contains details related to the original author even if that author is a spam bot. Establishing the path that produces a sample may help attribute the sample to a particular set of sources.

In some cases, a sample may originate from more than one source. For example, in a spam campaign where a spam botnet sends out Zeus binaries to victims, it is possible that multiple IPs and spoofed e-mail addresses are sending out the same binary. Restricting the association between source and sample to a one-to-one relationship means the analysis system will overlook valuable intelligence. The disclosed embodiments may identify many-to-many relationships between samples and sources. Accordingly, if multiple spam campaigns sent the same binary (as indicated by each sample having the same cryptographic hash value), the disclosed embodiments are capable of providing multiple sources for a single file and quickly show that the multiple spam campaigns have a common actor operating them. Therefore, allowing multiple sources for any sample gives disclosed embodiments greater flexibility to make associations that would otherwise not be obvious to analysts.

Consistent with the disclosed embodiments, associations between samples and sources may be identified using metadata. Files exchanged and transmitted over a network, such as the Internet, contain metadata. Metadata is data about data. An example of metadata is the Document Summary information available in Microsoft Word® documents. This information defines some characteristics of the document (data). Therefore, the Document Summary information is the data about the data, or its metadata. Other types of metadata may be derived from data, and include metadata such as timestamps, cryptographic hashes, strings, child-parent relationships, and fuzzy hashes, such as SSDeep.

Based on the metadata, the disclosed embodiments may derive attributes of the objects. An attribute is any characteristic of an object that may provide information that the disclosed embodiments can use to make fuzzy associations or concrete associations between multiple objects. An object can have multiple attributes and, at a high level, the object may provide an abstraction for these details when making associations. An executable program, for example, whether malicious or not, contains a set of metadata that defines unique characteristics for the sample. Any executable that runs on a Microsoft Corp. Windows operating system may contain a valid portable executable (PE) header. The PE header may contain a set of information that defines additional characteristics of the executable. Fields such as section names, compile times, compiler versions, memory usage, platform requirements and import tables give an executable a potentially unique fingerprint. Other examples include PDF metadata, such as creation dates, authors, languages and e-mail header data, such as the source IP address, and the e-mail agent and content boundaries. Associations may therefore be made based on the attributes derived from the metadata.

Other than metadata, other elements of the objects, such as code and data, may also provide unique attributes. For example, assuming an executable contains strings such as "PoisonIvy1.1" or "Hi, Rob's Mom! Look what I did!" By cataloging these strings and associating them with the sample, the disclosed embodiments may define new attributes of the sample. Accordingly, linking these object attributes may associate two samples that have very different PE headers, different cryptographic signatures and different sources. Such an association would, in turn, allow the association of multiple sources by virtue of the link between the samples.

Reference will now be made in detail to exemplary embodiments, examples of which are illustrated in the accompanying drawings. Wherever convenient, the same reference numbers will be used throughout the drawings to refer to the same or like parts.

FIG. 1 is a diagram illustrating an exemplary metadata association system 100, consistent with disclosed embodiments. As shown in FIG. 1, metadata association system 100 may be a back-end system 101, include a front-end system 102, and one or more external components such as an external sample provider 103. It is contemplated that more or less components may be included in metadata association system 100.

Back-end system 101 may include a controller 120 configured to accept new samples for processing, for example, from external sample provider 103. Back-end system 101 may further include one or more processing nodes 140 configured to process the samples in order to extract metadata and make associations, and a storage 130 configured to store the samples.

Consistent with some embodiments, controller 120 may be the primary coordination server for metadata association system 100. Controller 120 may manage the various sample inputs, distribute the processing of samples to processing nodes 140, and coordinate sample integration into storage 130 as well as conducting overall system administration. Controller 120 may operate as an interface between back-end system 101, front-end system 102, and the external components. Controller 120 is described in greater detail in connection with FIG. 2.

Processing nodes 140 are configured to primarily handle the task of extracting metadata from samples. Processing nodes 140 may first determine the file type of a sample. Based on the file type, processing nodes 140 may determine the appropriate class for the sample and use a class specific metadata extraction process to extract the relevant metadata from the sample. Processing nodes 140 may transfer the extracted metadata to storage 130. Processing nodes 140 are described in greater detail in connection with FIG. 3.

Consistent with some embodiments, controller 120 may maintain a queue of samples waiting for processing and integration. As new samples enter metadata association system 100, they are placed within a processing queue that controller 120 maintains. Controller 120 may distribute the samples in the queue to processing nodes 140 as nodes become available. As processing nodes 140 complete their metadata extraction process, they may report back to controller 120 that the sample is ready for integration into metadata association system 100. Controller 120 may then repurpose any available processing nodes 140 to make associations between samples using the previously extracted metadata.

Back-end system 101 may collect a significant amount of information from samples including metadata and associations. Storage 130 may be configured to store this information along with the samples from which the information origins. In some embodiment, storage 130 may include an Intelligence Storage System (ISS) 131 and a Binary Storage System (BSS) 132. ISS 131 may be responsible for storage of the intelligence obtained by back-end system 101. ISS 131 may include an interface and a database. The interface may provide a unified interface to the database. Therefore, any access (read or write) to ISS 131 may first go through the interface that in turn will communicate with the database.

In some embodiments, ISS 131 may have discrete access levels to ensure that only authorized personnel can manipulate or view the information. These levels of access may allow for the partitioning of records along a variety of lines. For instance, only authorized entities (analysts, back-end components) may have write access to the database. In some embodiments, it may allow anonymous access to the cryptographic hashes of samples, but require authenticated access to the remainder of the data for a given sample.

BSS 132 may be responsible for the storage and retrieval of samples that back-end system 101 receives. In some embodiments, BSS 132 may be a file system that houses the samples in their original form, with the exception of that their original filename may change to facilitate more rapid, cohesive storage. Similar to ISS 131, access to BSS 132 also occurs through an interface. For samples that are not themselves a file, notably URLs, BSS 132 may record the sample in a file format that ensures the content of the sample is faithfully archived.

Front-end system 102 may include one or more web servers 110 configured to manipulate the intelligence that back-end system 101 generates into a form that a human can interact with. For example, front-end system 102 may provides a variety of different methods to view the generated intelligence, to navigate associations, and to administer the overall system and the samples within the system.

External sample provider 103 may include a plurality of third party sample providers that acquire new samples for processing. These third party sample providers may each have their own unique way of transferring samples to back-end system 101. To accommodate each provider's communication method, back-end system 102 may provide a modular interface between the core of back-end system 101 and the third-party sample providers that can adapt to changing communication frameworks while at the same time providing a uniformed import method.

Components of metadata association system 100, such as web servers 110, controller 120, and processing nodes 140, may be implemented in various ways. For example, each of them may be a general purpose computer, a server, a mainframe computer, or any combination of these components. They may communicate over a link with a network, such as Internet. For example, the link may be a direct communication link, a LAN, a WAN, or other suitable connection. Consistent with some embodiments, they may each include a processor, a memory, input/output (I/O) devices, storage devices, and etc.

The processor may include one or more known processing devices, such as a microprocessor from the Pentium™ or Xeon™ family manufactured by Intel™, the Turion™ family manufactured by AMD™, or any of various processors manufactured by Sun Microsystems. The memory may be configured to store information used by the processor to perform certain functions related to disclosed embodiments. The storage devices may each include a volatile or non-volatile, magnetic, semiconductor, tape, optical, removable, nonremovable, or other type of storage device or computer-readable medium.

The memory may be configured with an operating system (not shown) that performs several functions well known in the art when executed by the processor. By way of example, the operating system may be Microsoft Windows™, Unix™, Linux™ Solaris™, or some other operating system. The choice of operating system, and even the choice to use an operating system, is not critical to any embodiment.

In one embodiment, the memory may also include one or more malware classification programs or subprograms loaded from the storage devices or elsewhere that, when executed by the processor, perform various procedures, operations, or processes consistent with disclosed embodiments. For example, the memory may include a malware association program that collects binary samples from various sources; a metadata extraction and attribute processing program that classifies each sample file, extracts metadata from each sample file, and stores the attributes in a database or other data repository; an attribute association program that obtains a reference sample and performs analysis on the stored attributes to identify relationships and associations between the reference sample and other samples; and/or an integrative support program that links the other programs and allows them to use a common database, provides a common user interface, performs basic bookkeeping tasks, (such as controlling access to the stored attributes or enabling the removal or insertion of a stored sample), and provides user guidance and help. The memory may also include other programs that perform other functions and processes, such as programs that provide communication support, Internet access, etc.

The I/O devices may receive data from external machines and devices and output data to external machines and devices. The I/O devices may also include one or more digital and/or analog communication input/output devices that allow communication with other machines and devices. The configuration and number of input and/or output devices incorporated in I/O devices may vary as appropriate for certain embodiments.

Figure 2:
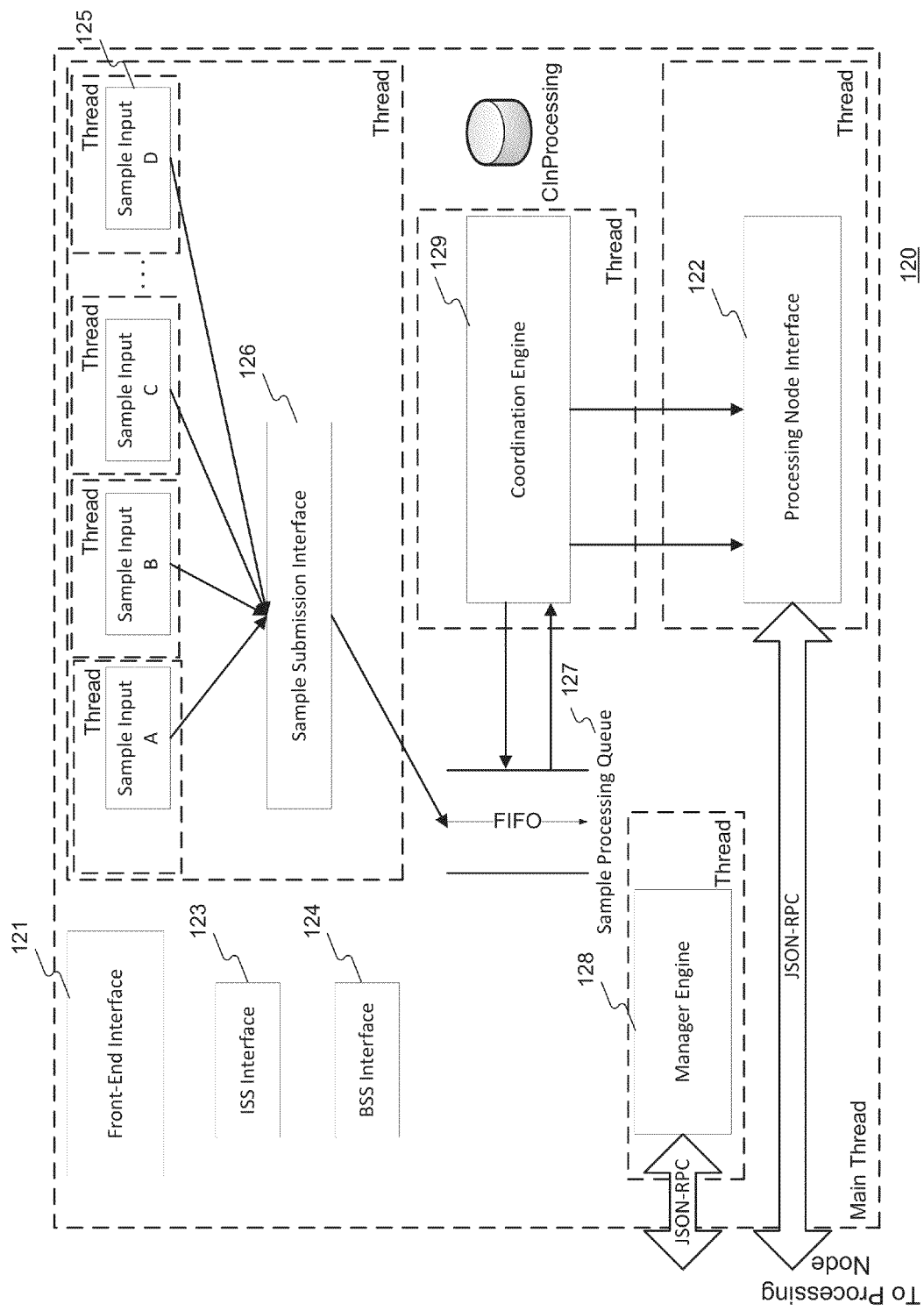
FIG. 2 is a diagram illustrating an exemplary controller of a metadata association system, consistent with disclosed embodiments.

FIG. 2 is a diagram illustrating an exemplary controller 120 of metadata association system 100, consistent with disclosed embodiments. In some embodiments, controller 120 may include several distinct subcomponents, including: a front-end interface 121, a processing node interface 122, an ISS interface 123, a BSS interface 124, external sample source interfaces 125, a sample submission interface 126, a sample processing queue 127, a management engine 128, and a coordination engine 129.

The various interfaces of controller 120 provide data transmission and other communication functions between controller 120 and services external to controller 120. For example, front-end interface 121 facilitates the communication between controller 120 and front-end system 102. Processing node interface 122 provides communication between controller 120 and processing nodes 140. ISS interface 123 and BSS interface 124 connect controller 120 with ISS 131 and BSS 132, respectively. External sample source interfaces 125 may receive samples from external sample provider 103. These interface subcomponents provide a unified abstraction between the inner workings of controller 120 and rest of metadata association system 100.

At the core of controller 120 lies certain primary subcomponents, namely, external sample source interfaces 125, sample submission interface 126, sample processing queue 127, and coordination engine 129. Sample submission interface 126 may provide the necessary abstraction between external sample source interfaces 125 and coordination engine 129, as well as sample processing queue 127. Sample processing queue may contain samples that metadata association system 100 has not yet processed. In some embodiments, sample processing queue 127 may be a first in first out (FIFO) queue, such that coordination engine 129 pulls samples from the queue in order to hand off to processing node interface 122.

Management engine 128 may be responsible for maintaining and monitoring the health of metadata association system 100. This subcomponent may be configured to verify the A/V definitions for the processing nodes, conduct configuration updates for the various components of metadata association system 100 (e.g., front-end 102, processing nodes 140, etc.), install new modules on-demand, and monitor the various components of metadata association system 100 (including the internal subcomponents of controller 120).

Given the potentially CPU and I/O intensive operations that metadata extraction requires, it is helpful to share these operations across multiple machines. Therefore, using more than one processing nodes 140 allows metadata association system 100 to scale horizontally as the number of samples increases. In some embodiments, processing nodes 140 may be lightweight in order to focus the majority of the CPU time on the metadata extraction process.

Figure 3:
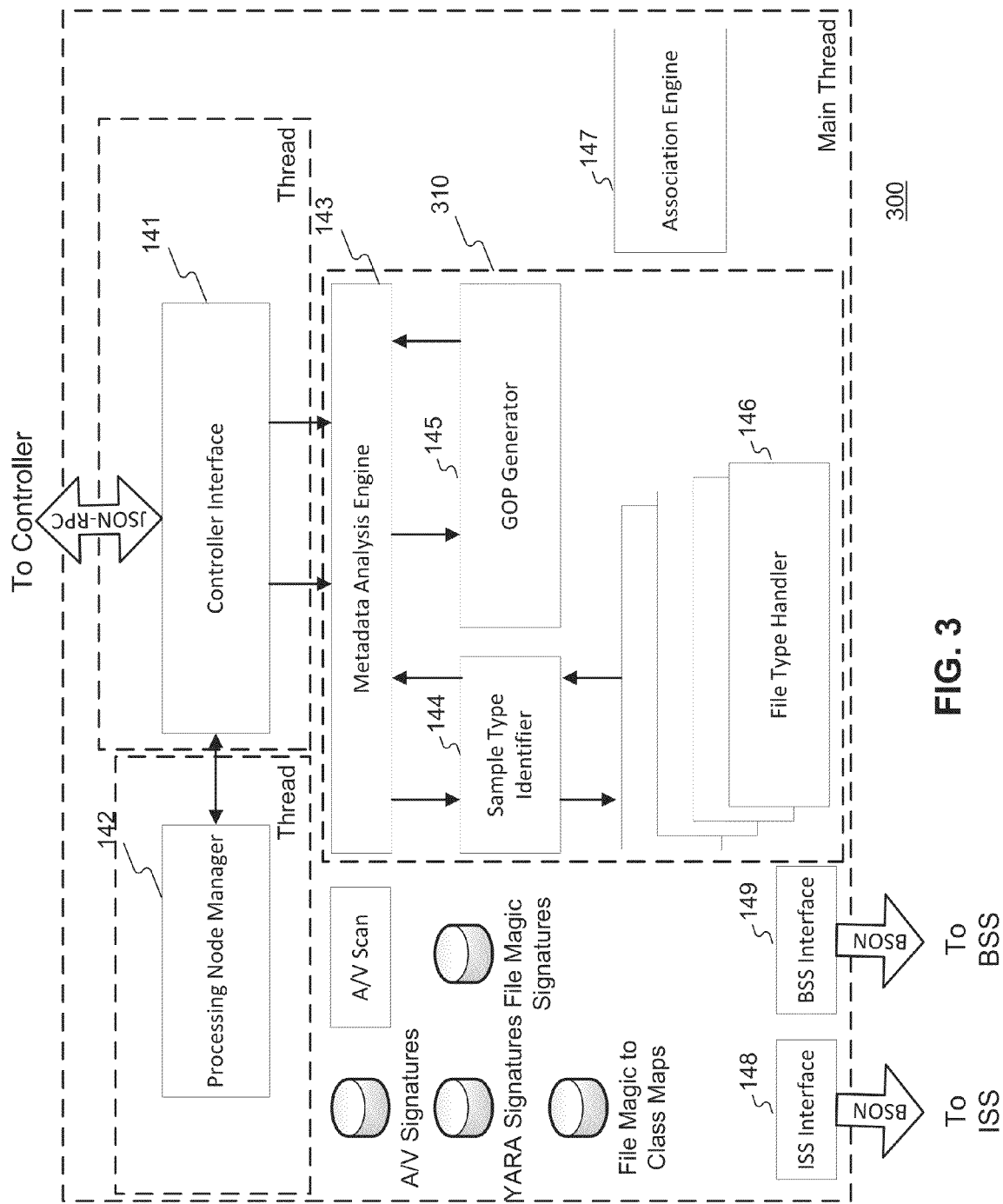
FIG. 3 is a diagram illustrating an exemplary processing node of a metadata association system, consistent with disclosed embodiments.

FIG. 3 is a diagram illustrating an exemplary processing node 300 of metadata association system 100, consistent with disclosed embodiments. Processing node 300 may include a variety of components that work together to extract information to produce the intelligence a sample can provide to metadata association system 100. In some embodiments, processing node 300 may include a controller interface 141, a sample processor 310, and an association engine 147. In addition, processing node 300 may contain configuration data as well as definition files for installed A/V product, file identifying magic bytes and YARA signature.

The various interfaces of processing node 300 may provide data transmission and other communication functions between processing node 300 and external services. For example, controller interface 141 may provide the abstraction for communication between the internal components of processing node 300 and controller 120. This interface may allow controller 120 to dictate the operations of processing node 300, monitor the status of processing node 300, and update any configuration or definition files within processing node 300. Furthermore, ISS interface 148 and BSS interface 149 connect processing node 300 with ISS 131 and BSS 132, respectively.

Sample processor 310 may itself include a metadata analysis engine 143, a sample type identifier subcomponent 144, a GOP (Generic Object Profile) generator 145, and multiple file type handlers 146. GOP generator 145 may produce the generic object profile for a sample. This subcomponent may use information from the A/V definitions or the YARA definitions. Sample type identifier subcomponent 144 may determine the type of sample controller 120 distributes to processing node 300. Sample type identifier subcomponent 144 may feed the sample to one of file type handlers 146 (based on the sample type identifier's type determination) which extract the type specific metadata. File type handlers 146 may be modular in design so that it can be added or removed without interrupting the operations of processing node 300.

In some embodiments, sample type identifier 144 may allow for loose type identifications. That is, sample type identifier 144 may generate file type information along with the class type of the sample. For example, if there are two PDF samples, one of version 1.1 and the other of version 1.7, sample type identifier 144 would produce a file type of their respective versions and also produce a class declaration of "Delivery File, PDF." Sample type identifier 144 thus may have enough information to hand the sample off to the appropriate file type handler 146.

Collectively, the GOP and sample type specific information make up a sample's metadata profile. Metadata analysis engine 143 may coordinate the information and package the information for transmission to controller 120 through the controller interface 141.

Association engine 147 may be configured to identify associations among the samples processed by sample processor 310. In some embodiments, association engine 147 may establish various different types of associations between two samples. In some embodiments, association engine 147 may assign a level of confidence to each type of association identified between two samples. The level of confidence for an association determines how reliable association engine 147 regards an association. High confidence matches, for instance, represent solid links, and denote nearly irrefutable associations between two samples (e.g. the link between a source that drops a sample). On the other hand, a low confidence match represents a tenuous, at best, association between two samples.

The first exemplary association may be a parent-child association. Because a sample typically comes from a source, the sample may be traced back to the source. In this case, the source is a parent to the sample, and the sample is a child to the source. For example, when a PDF contains JavaScript, the PDF becomes the parent and the JavaScript becomes the child. The parent-child association between the two samples usually has a high level of confidence. The use of the parent-child association may the foundation to construct groups. While the other association types can introduce new associations between disconnected samples, the parent-child association performs as a foundation upon which the other associations overlay.

Another exemplary association may be the binary level fuzzy hashing association. Cryptographic hashes such as MD5 and SHA-1 are normally used in files for security purposes. This information provides association engine 147 with the ability to find exact duplicates within the file set. For example, the use of fuzzy hashing algorithm hashes allows for the identification of samples that are closely related but do not match bit-for-bit. Association engine 147 may assign each sample within the file set, regardless of its class, a fuzzy hashing signature. Fuzzy hashing comparisons provide a level of confidence regarding the relationship between two samples. For example, a percentage number of the file that matches may be used to indicate the level of confidence.

Similar to the binary level fuzzy hashing association, association engine 147 may also identify a string set fuzzy hashing association. For example, association engine 147 may identify relationships of samples by looking at the reuse of strings within samples. In some embodiments, association engine 147 may use fuzzy hash values of each string set to determine the match between the samples.

Another exemplary association may be the email source association. Email represents the most likely attack vector as it allows files to pass from an external source to a victim's machine so long as it can escape the victim's spam filter and the recipient's common sense. With emails that originate from various sources, as is the case with emails originating from spam bots, it is difficult to make connections between such spam emails. The email source association may provide insights into the malware families that originate from email. For instance, by looking at the sender's IP address or the sender's email address (even if that address is fake), it is possible to associate malware families to a set of actors that transmit the malware family via email.

Yet another exemplary association may be the command and control association. Command and control (C&C) servers are typically specific to one actor (or actor group). However, these C&C servers are not necessarily specific to one malware family or one version of the same malware family. This overlap may lead to the identification of new associations. Therefore, identification of C&C association may rely on network traffic from the malware samples within the file set, in order to determine if there is any overlap at the C&C level.

In some embodiments, association engine 147 may determine an overall level of confidence between two samples by using the differing levels of confidence in a cumulative fashion. Consequently, two lower level of confidence matches can result in a higher level of confidence association.

Association engine 147 may be further configured to generate intelligence based on the metadata identified associations. For example, groups may be generated out of the large number of samples and the multitude of sources available. To group the samples, association engine 147 may combine the associations to form larger, pseudo-associations. In some embodiments, groups may constitute samples that have a high level of confidence in their association. For example, a group may contain samples that have a collaborative match level of at least 0.90. Not all members of a group may have associations as long as they have an association with at least one other member of the group.

The information collected by back-end system 101 may be further processed and manipulated by front-end system 102 before presenting to an analyst. For example, front-end system 102 may be configured to coordinate the various intelligence sources back-end system 101 contains and to produce a suitable representation of the information for the analyst. In addition, front-end system 102 may be configured to allow analysts access to the samples within BSS 132.

Figure 4:
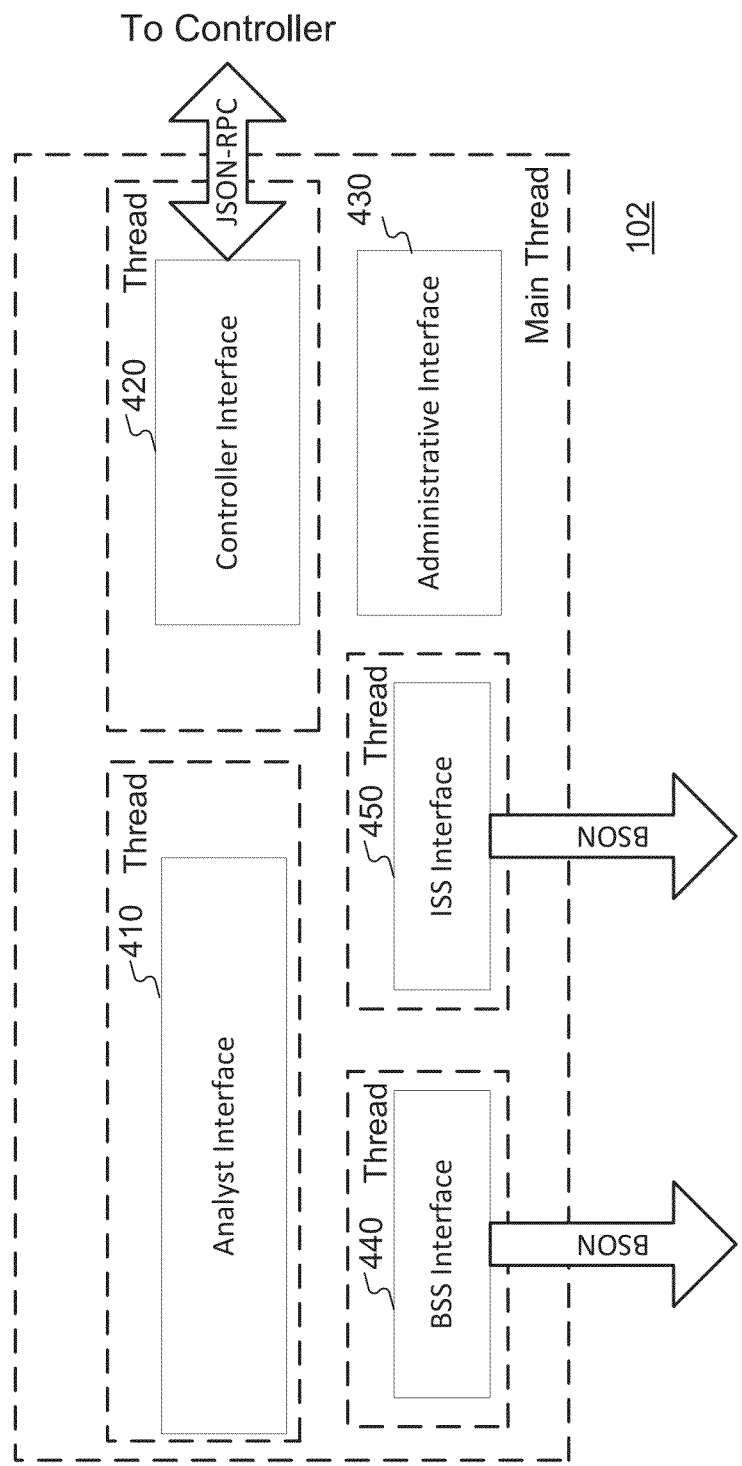
FIG. 4 is a diagram illustrating an exemplary front-end system of a metadata association system, consistent with disclosed embodiments.

FIG. 4 is a diagram illustrating an exemplary front-end system 102 of metadata association system 100, consistent with disclosed embodiments. In some embodiments, front-end system 102 may include: an analyst interface 410, a controller interface 420, an administrative interface 430, a BSS interface 440, and an ISS interface 450.

Analyst interface 410 is primarily an interface between metadata association system 100 and the analysts. The interface may provide a simplified representation of the data while providing the analyst with an ability to navigate the complex data set. In some embodiments, analyst interface 410 may be adaptable for a vast array of web browsers, such as Internet Explorer, Firefox and Chrome. In some embodiments, analyst interface 410 may be extensible to allow for additional interface components. In some embodiments, analyst interface 410 may also be compartmentalized to allow for the interface to become a component of a larger system.

Given that analyst interface 410 has access to the system's intelligence store, analyst interface 410 allow access by only authorized individuals. Accordingly, analyst interface 410 may have a basic authentication and authorization unit. The unit may support various access levels, including view-only (guest), submission-only, analyst, and administrator. The view-only access level may provide access to the system's metadata and associations, but it may not provide access to download any information, specifically the files within ISS 131. The submission-only access level may not allow viewing of any metadata, associations or files currently in ISS 131. However, this level may allow submission of new files to the system for processing. The analyst access level may grant full access to all of the metadata, associations and files within ISS 131, as well as giving users the ability to introduce new metadata and association information. The administrator level may give privileges of the analyst level along with the ability to administer the system's underlying components via administrative interface 430.

In some embodiments, analyst interface 430 may provide interactive user interface that allows the analyst to navigate the metadata and associations that the system generates. For example, the analyst may be allowed to filter metadata that they deem extraneous while preserving the underlying associations that the metadata may contribute. In some embodiments, especially for large scale sample visualization, analyst interface 430 may provide a navigable, graphic visualization of the sample set, the associations between the samples and the groups that the associations produce. For example, the analyst may be allowed to drill-down into any particular group or set of associations to focus the image to only a subset of the overall samples. While the methods for implementing such a subset selection may vary, some exemplary methods may include: distance selection (the number of associations between any two samples), re-centering (changing the base sample upon which a subset centers), metadata queries (generating subsets based on analyst defined metadata values), drill-down (narrowing a subset's range by following a specific association path), and group selection (removing any sample from view that does not belong to a particular group).

In some embodiments, analyst interface 430 may provide the metadata of samples within a visualization group to the analyst. For example, the analyst may select a sample from any of the available visualization graphs, and analyst interface 430 may display the metadata for that sample available to the analyst while not disturbing the original visualization graph.

For analysts who have the appropriate level of access, analyst interface 430 may also provide the ability for the analyst to directly modify the metadata of specific samples. This may include, for example, the ability to remove, change or add metadata entries for samples that may change the association between the affected sample and the remaining samples in ISS 132.

Administrative Interface 430 may be a web-based user interface similar to analyst interface 410, but with the primary function of administering front-end 102. Administrative interface 430 may operate on standard web browsers such as Internet Explorer, Chrome and Firefox. Administrative interface 430 may handle various administrative tasks such as system performance monitoring, processing queue management, audit log extraction and sample management. In some embodiments, administrative interface may include a module design that allows for the introduction of new administrative tasks when needed.

BSS interface 440 may also be a web-based user interface, operating on standard web browsers such as Internet Explorer, Chrome and Firefox. BSS interface 440 may allow users to locate samples within BSS 132 and save the samples (files) to a local storage device. Additionally, BSS interface 440 may also allow users to administer samples within BSS 132 to the extent that the user can, such as to change a sample's sharing status, or submit the sample to one of the various virus multi-scanners and sandboxes.

In some embodiments, front-end system 102 may additionally include controller interface 420 which facilitate communication between internal components of front-end systems 102 and controller 120 in back-end system 101. Front-end system 102 may further include ISS interface 450 connecting front-end system 102 to ISS 131.

Figure 5:
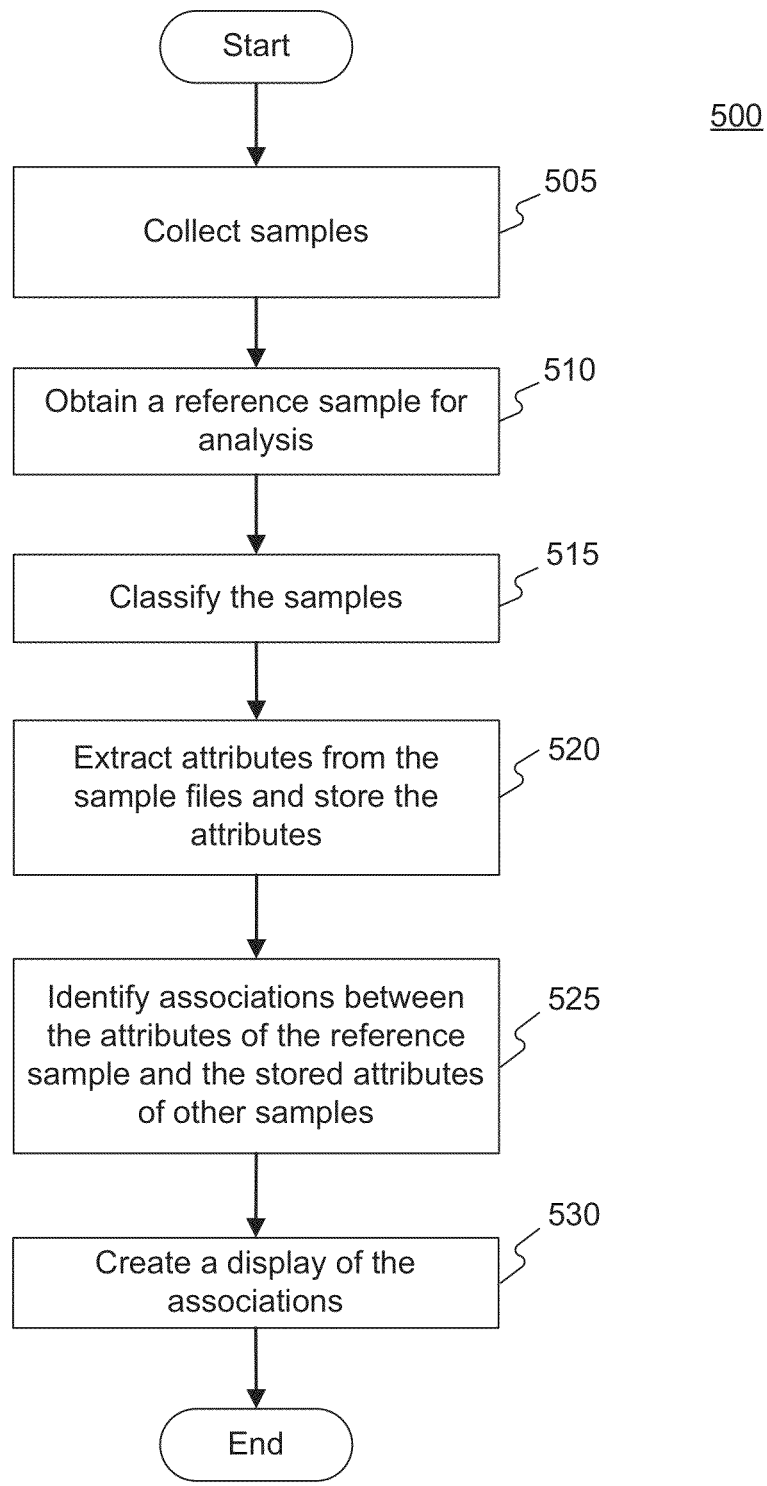
FIG. 5 is a flow diagram illustrating an exemplary processes for collecting, extracting, and analyzing metadata associated with binary samples, consistent with disclosed embodiments.

FIG. 5 is a flow diagram illustrating exemplary processes for collecting, extracting, and analyzing metadata associated with binary samples, consistent with disclosed embodiments. Process 500 is a high level view of how metadata association system 100 may identify associations between a reference sample and other samples by collecting binary samples, classifying the samples and extracting metadata from the samples, storing the metadata, and analyzing the stored metadata to determine relationships and associations between the samples and the reference sample. In certain embodiments, process 500 may be implemented by back-end system 101, and particularly, processing nodes 140.

In Step 505 of FIG. 5, metadata association system 100 may obtain binary samples. Binary samples may be obtained from external sample provider 103, from email attachments, from a database, from computer-readable media, etc. In some embodiments, controller 120 may receive the samples and distribute the samples to processing nodes 140 as they become available. In Step 510, metadata association system 100 may obtain a reference sample for analysis. In some embodiments, certain characteristics of the reference sample may be known to the analyst. For example, the analyst may know that the reference sample is malware. As each sample is collected, in Step 515, processing nodes 140 may classify the sample and determine an object type for the sample. Once a sample has been classified, in Step 520, processing nodes 140 may extract metadata from the sample and store the metadata as attributes for the particular object. In some embodiments, the attributes may be stored in ISS 131 and the samples may be stored in BSS 132.

In Step 525, metadata association system 100 may use the stored attributes to determine associations between the reference sample and the stored samples. In some embodiments, associations between just the stored samples may also be determined. For example, controller 120 may repurpose one or more processing nodes 140 to perform the association task. Based on the associations, groups of samples may be generated. Once the associations and/or groups are determined, the intelligence data may be stored in ISS 131.

In Step 530, metadata association system 100 may generate data used to display the associations and/or groups. For example, a display may be generated by front-end system 102 and presented to the analyst through analyst interface 410. In some embodiments where the reference sample is a known malware sample, metadata association system 100 may also generate an alert when the reference sample shares associations with any stored samples.

In Step 230, metadata association system 100 may generate data used to display the associations and/or groups. For example, a display may be generated by front-end system 102 and presented to the analyst through analyst interface 410. In some embodiments where the reference sample is a known malware sample, metadata association system 100 may also generate an alert when the reference sample shares associations with any stored samples.

Figure 6:
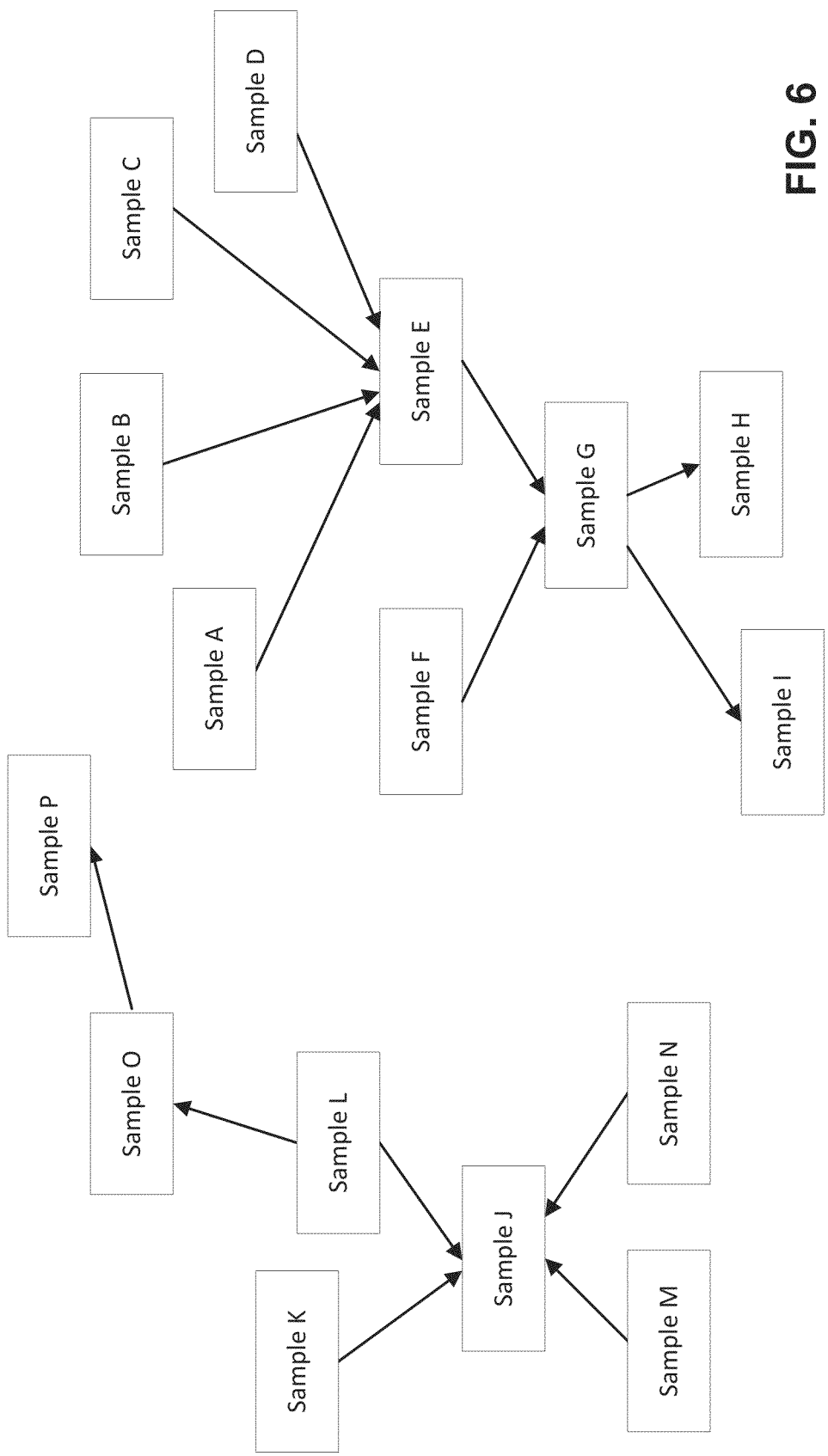
FIG. 6 is a diagram illustrating an interface for displaying associations between samples from a sample set, consistent with disclosed embodiments.

FIG. 6 illustrates an interface for displaying associations between samples from a sample set, consistent with disclosed embodiments. Metadata association system 100 may generate a display, for example like that of FIG. 6, after determining associations between a reference sample and a set of samples. For example, if an analyst requests the associations with a reference sample, metadata association system 100 may determine what other samples are associated with the particular sample, the particular sample's parent (if any), it's children (if any), and create a display, such as that shown in FIG. 6, to show the identified associations.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .NET Framework, .NET Compact Framework (and related languages, such as Visual Basic, C, etc.), Python, PHP, XML, Java, C++, JavaScript, HTML, HTML/AJAX, Rex, Silverlight, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A method, performed by a processor, for identifying associations between binary samples, comprising:
   receiving a plurality of binary samples;
   determining one or more file types associated with the plurality of binary samples;
   extracting type-specific metadata from the plurality of binary samples, the type-specific metadata for a binary sample from the plurality of binary samples including a set of attributes of the binary sample that are unique for a file type associated with the binary sample;
   identifying a set of associations between the plurality of binary samples based on the extracted metadata, each association characterized by at least one attribute in the set of attributes that the associated binary samples have in common, each association having a confidence level indicative of a strength of the association; and
   identifying associations in the set of associations with a confidence level that satisfies a predefined threshold.

2. The method of claim 1, further comprising:
   receiving a reference sample;
   identifying that the reference sample is associated with at least one binary sample among the plurality of binary samples; and
   generating a warning indicating the at least one binary sample.

3. The method of claim 1, wherein the set of associations include at least one of a parent-child association, an email source association, or a command and control association.

4. The method of claim 1, wherein the set of attributes include a Hash of the binary sample, and wherein the set of associations include at least one of a binary level fuzzy Hashing association or a string set fuzzy Hashing association.

5. The method of claim 1, further comprising:
   identifying multiple associations between two binary samples, the multiple associations having respective individual confidence levels; and
   generating a cumulative confidence level for the two binary samples, by adding up the individual confidence levels of the multiple associations, 6. The method of claim 1 further comprising:
   identifying that at least one binary sample among the plurality of binary samples is associated with a malware sample; and
   generating a warning indicating that the at least one binary sample is associated with the malware sample.

7. A system for identifying associations between binary samples, comprising:
   a controller configured to cause a processor to receive a plurality of binary samples from one or more sample providers; and
   one or more processing nodes each configured to:
      determine one or more file types associated with the plurality of binary samples;
      extract type-specific metadata from the plurality of binary samples, the type-specific metadata for a binary sample from the plurality of binary samples including a set of attributes of the binary sample that are unique for a file type associated with the binary sample;
      identify a set of associations between the plurality of binary samples based on the extracted metadata, each association characterized by at least one attribute in the set of attributes that the associated binary samples have in common, each association having a confidence level indicative of a strength of the association; and
      identify associations in the set of associations with a confidence level that satisfies a predefined threshold.

8. The system of claim 7, wherein the controller is further configured to receive a reference sample, and wherein the one or more processing nodes are each further configured to:
   identify that the reference sample is associated with at least one binary sample among the plurality of binary samples; and
   generate a warning indicating the at least one binary sample.

9. The system of claim 7, wherein the set of associations include at least one of a parent-child association, an email source association, or a command and control association.

10. The system of claim 7, wherein the set of attributes include a Hash of the binary sample, and wherein the set of associations include at least one of a binary level fuzzy Hashing association or a string set fuzzy Hashing association.

11. The system of claim 7, wherein the one or more processing nodes are each further configured to:
    identify multiple associations between two binary samples, the multiple associations having respective individual confidence levels; and
    generate a cumulative confidence level for the two binary samples, by adding up the individual confidence levels of the multiple associations.

12. The system of claim 7, further comprising a storage device configured to store the plurality of binary samples, the metadata of the plurality of binary samples, the set of associations identified between the plurality of binary samples, and the respective confidence levels of the set of the associations.

13. The system of claim 12, further comprising a front-end system configured to:
    receive a selection of a subset of binary samples;
    retrieve the subset of binary samples and the corresponding associations between the subset of binary samples from the storage device; and
    generate data used to display the retrieved associations between the subset of binary samples.

14. The system of claim 7, wherein the controller is configured to distribute the plurality of binary samples among the one or more processing nodes through a first in, first out (FIFO) processing queue, for extracting the metadata from the plurality of binary samples.

15. The system of claim 14, wherein the controller is configured to redistribute the plurality of binary samples among the one or more processing nodes based on availability of the one or more processing nodes, for identifying the set of associations between the plurality of binary samples.

16. The system of claim 7, wherein the controller is further configured to receive a malware sample, and wherein the one or more processing nodes are each further configured to:
    identify that at least one binary sample among the plurality of binary samples is associated with the malware sample; and
    generate a warning indicating that the at least one binary sample is associated with the malware sample.

17. A non-transitory computer-readable medium having stored thereon instructions that, when executed by a processor, performs a method for identifying associations between binary samples, the method comprising:
    receiving a plurality of binary samples;
    determining one or more file types associated with the plurality of binary samples;
    extracting type-specific metadata from the plurality of binary samples, the type-specific metadata for a binary sample from the plurality of binary samples including a set of attributes of the binary sample that are unique for a file type associated with the binary sample;

identifying a set of associations between the plurality of binary samples based on the extracted metadata, each association characterized by at least one attribute in the set of attributes that the associated binary samples have in common, each association having a confidence level indicative of a strength of the association; and identifying associations in the set of associations with a confidence level that satisfies a predefined threshold.

18. The computer-readable medium of claim 17 wherein the method further comprises:

receiving a reference sample;

identifying that the reference sample is associated with at least one binary sample among the plurality of binary samples; and generating a warning indicating the at least one binary sample.

19. The computer-readable medium of claim 17, wherein the set of associations include at least one of a parent-child association, an email source association, or a command and control association.

20. The computer-readable medium of claim 17, wherein the set of attributes include a Hash of the binary sample, and wherein the set of associations include at least one of a binary level fuzzy Hashing association or a string set fuzzy Hashing association.

21. The computer-readable medium of claim 17, wherein the method further comprises:

identifying multiple associations between two binary samples, the multiple associations having respective individual confidence levels; and generating a cumulative confidence level for the two binary samples, by adding up the individual confidence levels of the multiple associations.

* * * * *